June 14, 1960 — D. A. CASWELL — 2,941,168

UNIDIRECTIONAL TRANSMISSION LINE

Filed Feb. 23, 1954 — 2 Sheets-Sheet 1

INVENTOR.
DWIGHT A. CASWELL

BY Lippincott & Smith

ATTORNEYS

June 14, 1960 D. A. CASWELL 2,941,168

UNIDIRECTIONAL TRANSMISSION LINE

Filed Feb. 23, 1954 2 Sheets-Sheet 2

INVENTOR.
DWIGHT A. CASWELL
BY
Lippincott & Smith
ATTORNEYS

United States Patent Office 2,941,168

Patented June 14, 1960

2,941,168

UNIDIRECTIONAL TRANSMISSION LINE

Dwight A. Caswell, Los Gatos, Calif., assignor, by mesne assignments, to Monogram Precision Industries, Inc., Culver City, Calif., a corporation of California Filed Feb. 23, 1954, Ser. No. 411,609

1 Claim. (Cl. 333—24)

This invention relates to unidirectional transmission lines of the wave guide type; specifically, to lines which will propagate electromagnetic waves within a limited band of frequencies in one direction with very slight attenuation whereas waves in the opposite direction are highly attenuated, the difference in attenuation in the two directions of propagation may be 20 db or more.

Among the objects of the invention are to provide a wave guide of character described which is light, compact, and rugged; to provide such a wave guide which will operate over a reasonably wide band of frequencies so that it may be used for the control of modulated waves; to provide a wave guide of the character described which does not require a source of auxiliary power and therefore may be used in fixed circuits, where it is in constant readiness to serve, so that no damage can result from power failure; to provide, in addition, a device which, because of its portability and simplicity is well adapted for laboratory use as well as for installation in fixed set-ups; to provide a type of device whereof a plurality may be used in cascade to produce as great a degree of differential attenuation as may be desired; to provide a device which provides a satisfactory impedance match with standard types of wave guide; to provide a static device which is capable of performing automatic switching in circuits of certain characters; and to provide a device which, without attendance, auxiliary power, or other additional apparatus, is in effect a "four-terminal network" which does not follow the reciprocity law.

Broadly the wave guide of this invention employs the "Farady effect," in accordance with which the plane of polarization of an electro-magnetic wave is rotated by passage through a magnetic field, which is parallel with the direction of propagation of waves in certain types of ferromagnetic materials. This effect is non-reciprocal in nature; i.e., waves propagated along the nominal direction of lines of force of the field are rotated clockwise, whereas waves traveling in the opposite direction are rotated counterclockwise. The effect occurs in certain ferromagnetic material, specifically in the "ferrites" which are combinations of ixides of bivalent metals crystallizing on the cubic system. In accordance with the invention the waves to be operated upon are fed into the device through a wave guide which will support waves polarized in one plane only, and are fed out of the device into a similar wave guide which will support only waves polarized at an angle displaced 45° from those transmitted from the input guide. The wave guide of the device itself is of a form which will propagate waves polarized in any plane. It may either be substantially circular or square, since a guide of the latter form will propagate the two orthogonal components of an obliquely polarized wave with the same velocity, and hence effectively transmit the wave as a whole without distortion, or of any other cross-section which is symmetrical and of substantially equal dimension in the directions of two axes of symmetry. Located centrally of a short length of such wave guide comprising a short permanent bar magnet having a high coercive force and developing a powerful field, preferably one of the alloys such as "Alnico-V," which is provided with extensions of a suitable ferrite. This magnetic structure is supported axially of the wave guide and the proportions of the ferrite extensions are so chosen in relation to the strength of the field developed by the bar margnet as to produce a 45° rotation of the plane of polarization of waves propagated therealong. Waves transmitted into the device from one direction are rotated 45°, into the plane of polarization which the output wave guide will support, while waves propagated in the other direction are oppositely rotated so that they are polarized at an angle of 90° from those which will be supported by the input wave guide and are therefore rejected. At each end of the guide, where it is coupled to the input and output rectangular wave guides, there is provided an absorber, which may be in the form of a card or sheet of resistive material which is so oriented as to absorb waves polarized at 90° from the angle of those transmitted by the particular guide with which the absorber is associated, and to be substantially without effect upon waves polarized so as to be transmitted by the respective guides. Alternatively the absorber may be an antenna or loop arranged to couple with another line leading to an external absorber. Preferably, if the internal absorber is used, the card or sheet of insulating material of the absorber is notched to provide a tab or projection which is substantially a quarter-wavelength long at the center frequency of the band transmitted by the guide, this tab becoming, in effect, a quarter-wavelength coupling section for the absorbed waves. As a result of this arrangement waves coming into the guide from the direction in which propagation is undesired, upon reaching the opposite end of the guide where they otherwise would be reflected, are largely absorbed; those reflected are again absorbed as they re-traverse the absorbing device, and, being polarized at 90° from those received from the input guide, are subjected to a further 45° rotation as they pass through the magnetic field to arrive at the output end in such plane that they are further attenuated by the absorber located at that point, resulting in substantially complete attenuation in the double reflection.

A preferred embodiment of the invention is shown in the accompanying drawings and will be more fully described in connection therewith. In the drawings.

Figure 1:
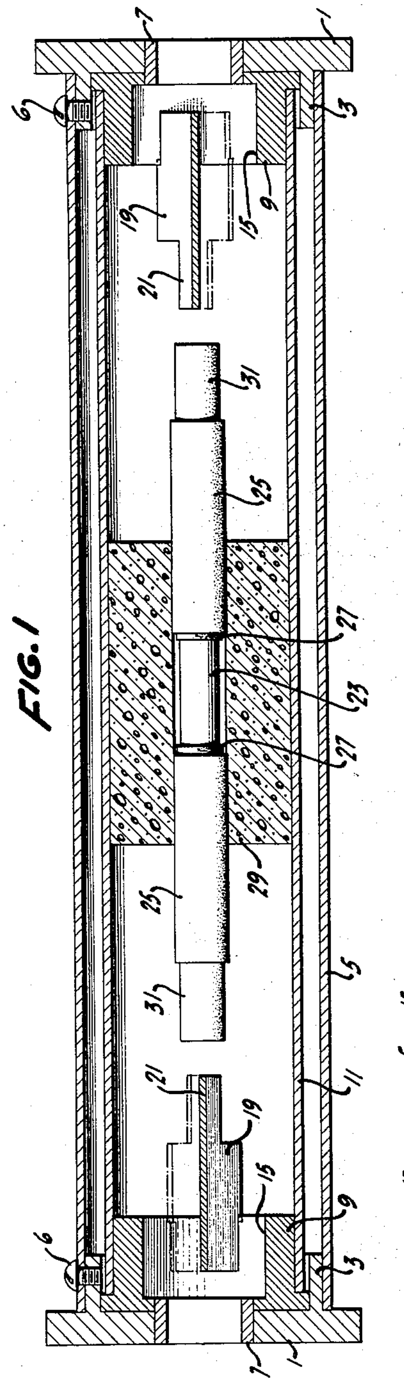
Fig. 1 is a longitudinal section of a unidirectional wave guide in accordance with the present invention.

Considering first the mechanical structure of the invention as illustrated in Fig. 1, there is provided a pair of rectangular flanges 1 which are located at each end of the device and serve as its general support. Projecting inwardly from each of these flanges is a circular collar 3, which fits within and supports an outer tubular casing 5, the latter being secured to the collar by suitable means such as screws 6. The casing 5 is purely for mechanical protection and does not enter into the electrical performance of the device.

The flange 1 is provided with a rectangular aperture dimensioned to fit a standard wave guide 7, of rectangular cross-section.

Fitted within the collar at each end is a transformer

Figure 4:
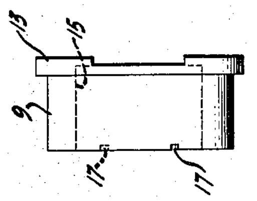
Fig. 4 is a side-elevation of the transformer.
Figure 3:
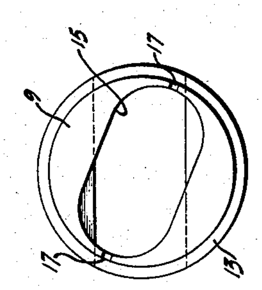
Fig. 3 is an end elevation of the transformer which connects the external wave guides to the device.
Figure 2:
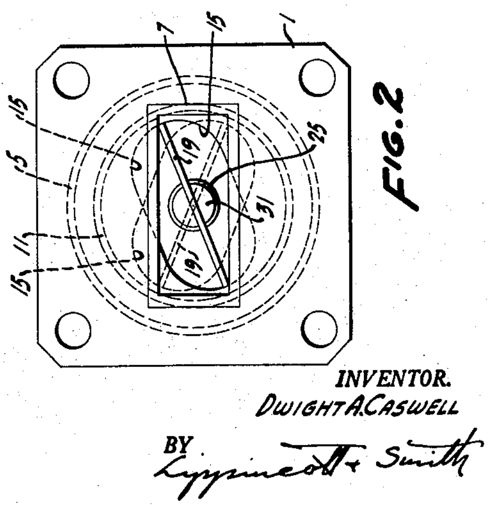
Fig. 2 is an end elevation of the wave guide of Fig. 1.

9. This transformer is best illustrated in Figs. 3 and 4. The transformer is cylindrical in external form, being provided with a shoulder 13 and a body portion 9 of slightly reduced diameter to fit within a tube 11 which forms the main section of the device, the shoulder 13 fitting snugly within the collar 3. An aperture through the transformer consists of two portions; facing outwardly from the flange is a slot extending transversely across the shoulder portion of the guide, the width of this slot corresponding to the shorter outer dimension of the wave guide to which the device is to be connected. The opening through the body of the transformer is in shape an oblong aperture 15 with arcuate ends, the longer dimension of the aperture being approximately equal to the longer internal dimension of the wave guide to which the device is to be coupled. The long dimension is disposed at an angle of 22.5° from the direction of the transverse slot and that of the longer dimension of the coupled wave guide. A pair of notches 17 is formed in the end of the body of the guide.

Figure 5:
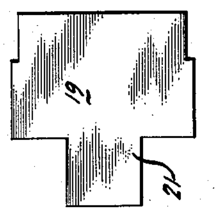
Fig. 5 is an elevation of the absorber.

The notches 17 serve to locate an absorber 19, one end of which fits within the aperture 15. The shape of the absorber is best shown in Fig. 5. It comprises a card or sheet of insulating material, on one or both surfaces of which there is deposited a resistive coating of materials such as carbon or the like. In practice sheet phenolic material, Bakelite for example, has been used for the card. Extending from the end of the body of the card is a tab 21 which is substantially one quarter-wavelength long at the mid-frequency of the band for which the device is designed. This tab serves as a matching section, as is well understood, and leads to better coupling of the absorber with the main section of the guide and hence to better absorption of the undesired waves and better transmission in the desired direction.

Centrally located within the body of the tube 11 and coaxial therewith there is supported a ferromagnetic structure comprising a bar magnet 23 having elongated extensions 25 of a suitable ferrite. Interposed between the magnet and the ferrite extensions are short non-magnetic spacers 27. This entire structure is supported in its axial position by a split cylinder 29, preferably formed of polystyrene foam. In manufacture cylinders of this foam are turned to size to fit snugly within the tubular guide 11, are bored axially, and then split and recemented together after the magnetic structure has been inserted, further cement preventing the polystyrene foam from sliding longitudinally within the wave guide.

The maching characteristics of the magnetic structure can be improved by the addition of quarter-wave sections 31 of a non-ferromagnetic insulating material. As shown these sections are preferably slightly smaller in diameter than the ferrite. They are cemented in place with any suitable material. These matching sections are not essential; they contribute a small but measurable improvement in the transmitting direction.

Considering now the operation of the device, it is well known that rectangular wave guides, such as are used to couple into the device here described, will, when supplied with frequencies within the range for which they are designed, support and propagate waves only in accordance with the $TE_{1,0}$ mode. The direction of polarization of waves entering the guide on the left-hand end of the device as shown in Fig. 1 is therefore fixed. These waves are fed into the transformer, where the plane of polarization of waves which it will support is rotated 22.5°. A loss might be expected at the transition, proportional to the square of the sine of 22.5°; actual measured losses are materially less than this would indicate, actual rotation of the plane of polarization occurring as well as reflection of the normal component. The loss in both transformers is only a fraction of a db. The waves actually transferred to the main section of the device are polarized at 22.5° with the horizontal.

The most critical feature in the manufacture of the apparatus is the proportioning of the magnetic system. The bar magnet is preferably formed of the highest grade permanent magnet material available. At the present time this is the alloy sold under the trade name of "Alnico-V." The desideratum is to obtain as short and as powerful a permanent magnet as can be obtained. The bar is first made to size, and then is magnetized to saturation.

The spacers 27 perform a function which is not clearly understood but which has, in practice, proved to be important. They are preferably made of a material having a rather low dielectric constant and of low loss; various materials have been used and actually wood has been found to be as satisfactory as anything which has been tried. Dry pine and balsa have both been used. As stated above, the reason for the functioning of these spacers is uncertain. Experiment has shown, however, that introduction of what is, in effect, a gap between the magnet and the ferrite which is the agent causing the Faraday rotation of waves propagated through the guide increases the effectiveness of the device and decreases insertion losses in the "pass" direction by a material improvement of impedance match between successive portions of the wave guide.

Ferrites exhibiting magnetic properties are marketed by several manufacturers and by each in numerous grades. The dimensions of the ferrite pole pieces which will produce the required degree of rotation depend upon a particular material used. That illustrated, for use in the frequency band already mentioned is identified as "No. 1331 Ferramic" and each of the pieces is 1.050 inches long. Another material which can be used is marketed as "Feroxcube 4A." While other materials of substantially similar characteristics can perhaps be obtained from other manufacturers the probability is that such other materials would operate best with slightly different dimensions, since these materials have not yet been sufficiently standardized as between various manufacturers to be completely interchangeable.

The apparatus is assembled with the magnets saturated and is surrounded by a solenoid. It is supplied with waves within the band wherein it is intended to operate from the end which is normally the output, with a detector coupled to the input end. The amount of rotation produced is a direct function of frequency, higher frequencies undergoing a greater degree of rotation. Starting with a saturated magnet maximum attenuation of the waves will be at a lower frequency than that desired. The frequency of the oscillator is swept over the band and the frequency at which maximum attenuation occurs is noted. Short bursts of demagnetizing current are then passed through the surrounding solenoid, until maximum attenuation is experienced at the center of the band. As already indicated, when this adjustment has been made a minimum differential attenuation of 20 db at the extremities of a 400 mc. band can be attained, or 13 db at the extremities of an 800 mc. band.

In the operation of the device a number of factors are involved which may not be obvious. In prior art devices involving Faraday rotation of microwaves the magnetic field in the rotating medium has been produced by a solenoid surrounding a ferrite or other material used for its rotational effect. The magnetic fields involved are very material, and using this method of generating them has involved the provision of an external source of power, which requires continuing expense, to say nothing of the additional bulk and weight of the apparatus as a whole. It might be expected that the insertion of a bar magnet in a wave guide of this character would involve their introduction of quite serious losses. This does not, however, prove to be the case. The magnet is located in the neutral plane. Effectively, the portion of the apparatus which it occupies is converted from a simple wave guide into a short section of coaxial conductor operating at a higher-order mode and therefore it might be expected that better results would be obtained by providing the magnet with coatings of a better conductor than that of the magnet itself, as, for example, by silver plating. This has not proved to be the case experimentally for if any improvement is obtained by such silver plating it is so small as to be within the limits of error of the measuring equipment. The loss introduced by the magnet is about 0.3 db out of a total of about 0.8 db insertion loss for the device as a whole. The bar magnet itself does not contribute to the phase rotation of the waves.

Figure 6:
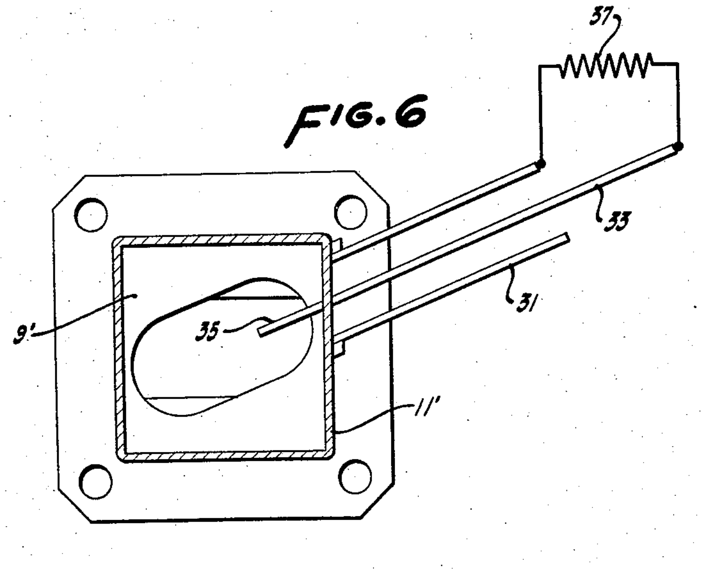
Fig. 6 is a cross-sectional view taken at one end of an embodiment of the invention employing a square main-section wave guide and using an external absorber for the non-transmitted wave.

There are a number of modifications of the device shown in the figures so far described which may be employed under certain conditions. Two such minor modifications are illustrated in Fig. 6. The first is the use of a square main section of wave guide 11′. This is coupled to the input and output guides through a transformer 9′ which differs from transformer 9 only in having a square instead of a circular outer periphery. Its function and characteristics are identical with those of the transformer 9.

The second feature of difference shown in Fig. 6 is the means used for absorbing the non-transmitted wave. A coaxial cable has an outer conductor 31 connected to the body of the guide 11′. The inner conductor 33 extends through the wall of the guide in the direction of the major axis of the transformer aperture so as to form an antenna 35 coupled with the electric field of the "non-transmitted" wave but not with that of the "transmitted" wave. A load, symbolized by a resistor 37, is fed by the coaxial line. With proper impedance match between guide, antenna, coaxial line and load such an external absorber is just as effective as the internal card.

It may be noted that such external absorbers may be mounted at either or both ends of the guide 11′ (or corresponding circular guide) whereupon the device becomes, in effect, a switch which may be used, for example, to connect an antenna to a transmitter and a receiver.

Figure 7:
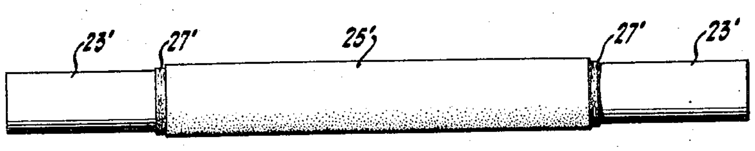
Fig. 7 shows, in elevation, a modified type of magnetic structure.
Figure 8:
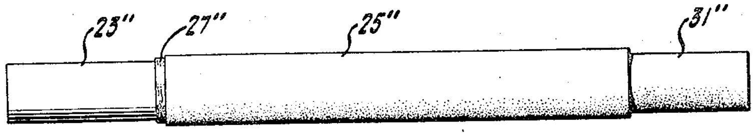
Fig. 8 shows another form of magnetic structure using a non-symmetrical arrangement of elements.

Figs. 7 and 8 illustrate modifications of the magnetic structure. In Fig. 7 there is shown a structure employing two permanent magnets, 23′, separated by spacers 27′ from a single ferrite section 25′. Each of the magnets is preferably one-fourth wavelength long.

In Fig. 8 a non-symmetrical magnetic structure is shown, comprising a single magnet 23″, spacer 27″, ferrite section 25″, and matching non-magnetic insulator 31″.

Such non-symmetrical structures are fully operative but are not in general as efficient as regards the use of materials or operation as the structures of Figs. 1 and 7. As between the latter two there is little to choose; that of Fig. 7 may have some theoretical advantage in producing a stronger more uniform magnetization of the ferrite, and in there being fewer impedance matches to be achieved. The matches themselves may not be as good, however, and the loss in two magnets may be greater than in a single one. The choice is largely dependent on manufacturing conveniences.

It should be apparent to those skilled in the art that it would be possible to substitute for the particular type of transformer that is used for the input and output of the main section of the line, short sections of rectangular wave guide twisted gradually through an angle of 22.5°. Careful measurements have shown, however, that the losses involved in the transformer employed are not sufficient to warrant the additional length and expense involved in providing an input and output of this character. Actually a greater proportion of the 0.8 db loss in the transmitting direction appears to be in the ferrite and the magnet itself. In this connection it may be noted that of the ferrites available on the market there are very great differences in the losses introduced when used in connection with this invention. Insufficient data are available from the manufacturers of such materials on which to found a statement as to what type shows least loss. A number of the ferrites will produce the Faraday effect and in general this effect is produced in proportion to the low frequency permeability of the material. This, however, has no direct bearing upon the amount of loss introduced for a given phase rotation.

One point should, perhaps, be mentioned in connection with what has been said about quarter-wave lines as coupling media within the apparatus. The example chosen for description is designed for a band centered on 9200 mcs. In free space this corresponds to a wavelength of 3.18 centimeters or between 1¼ and 1.3 inches. Because of the increased phase velocity within the wave guide the wave length at the frequency mentioned is about 2¼ inches, so the quarter wavelength sections are approximately .45 inch long.

It will be recognized that such actual dimensions as have been given in connection with the particular device described are applicable only to apparatus designed for its particular frequency band and would be modified in order to accommodate any other band. In general the description here given is intended as illustrative and not limiting, all intended limitations being expressed in the claim.

What is claimed is as follows:

A unidirectionally transmitting waveguide device, comprising a main waveguide section having a cross-section of substantially equal dimensions along two axes of symmetry, two end sections attached to respective ends of said main section for coupling said main section to axially and angularly alined, input and output waveguides of rectangular form adapted to propagate plane polarized electric waves having the same plane of polarization in both of said input and output waveguides, a body of ferrite mounted within said main waveguide section, and a magnet providing a magnetic field through said body of ferrite substantially parallel to the longitudinal axis of said main waveguide section, the dimensions of said body of ferrite and the field strength of said magnet being proportioned to produce a non-reciprocal rotation of substantially 45 degrees in the plane of polarization of waves transmitted through said main waveguide section, each of said coupling sections comprising conducting material having an aperture therethrough shaped at one end to mate with the respective one of the linearly and angularly alined, rectangular, input and output waveguides, said aperture continuing as an opening the form of which in cross-section is an oblong with arcuate ends, the longer axis of said oblong being disposed at an angle of 22½ degrees to the larger transverse dimension of the rectangular, input and output waveguides, the longer dimensions of the two oblongs at respective ends of the device being at an angle of substantially 45 degrees to each other whereby said coupling sections propagate into and out of said main section, respectively, waves the planes of polarization whereof are mutually displaced by an angle of substantially 45 degrees.

References Cited in the file of this patent

UNITED STATES PATENTS

| | | |
|---|---|---|
| 2,521,818 | Aron | Sept. 12, 1950 |
| 2,644,930 | Luhrs | July 7, 1953 |
| 2,705,780 | Weber | Apr. 5, 1955 |
| 2,719,274 | Luhrs | Sept. 27, 1955 |
| 2,748,353 | Hogan | May 29, 1956 |
| 2,809,354 | Allen | Oct. 8, 1957 |

FOREIGN PATENTS

| | | |
|---|---|---|
| 631,277 | Great Britain | Oct. 31, 1949 |
| 674,874 | Great Britain | July 2, 1952 |

OTHER REFERENCES

Publication I, Chait et al.: "Reduction of the Loss in Ferrite," Journal of Applied Physics, vol. 24, No. 1, January 1953.